United States Patent [19]

Colton

[11] 3,899,724
[45] Aug. 12, 1975

[54] SETTING UP MACHINE INCLUDING COMPUTER-CONTROLLED POSITIONER FOR MACHINE PART ADJUSTING ELEMENT

[75] Inventor: Peter Malcolm Colton, Leicester, England

[73] Assignee: Wadkin Limited, Leicester, England

[22] Filed: May 24, 1973

[21] Appl. No.: 363,554

[30] Foreign Application Priority Data
May 26, 1972 United Kingdom............ 24850/72

[52] U.S. Cl............... 318/162; 235/151; 29/33 R; 340/172.5; 340/147 MT; 83/699; 318/17; 408/146; 408/13; 82/34 R; 90/11 A; 235/61.6 R; 33/1 PT
[51] Int. Cl..................... B23q 17/18; B23q 3/18
[58] Field of Search....... 235/151; 340/187; 318/17, 318/162

[56] References Cited
UNITED STATES PATENTS
| | | | |
|---|---|---|---|
| 2,656,497 | 10/1953 | Schweighofer et al. | 318/162 X |
| 2,726,358 | 12/1955 | Barnhart | 318/17 |
| 3,323,029 | 5/1967 | Joseph | 318/17 |
| 3,650,303 | 3/1972 | Chambers et al. | 235/151 |

Primary Examiner—Eugene G. Botz
Attorney, Agent, or Firm—Larson, Taylor & Hinds

[57] ABSTRACT

A machine setting up unit according to the invention is used for moving machine elements to predetermined positions along their axes, comprises a positioner, or axis drive unit, for moving each machine element to a predetermined position along its axis. The positioner is controlled by a computer which receives information identifying the machine axis to which the positioner is connected, and calculates the movement necessary to position the machine element in its desired new setting for controlling the positioner accordingly.

7 Claims, 7 Drawing Figures

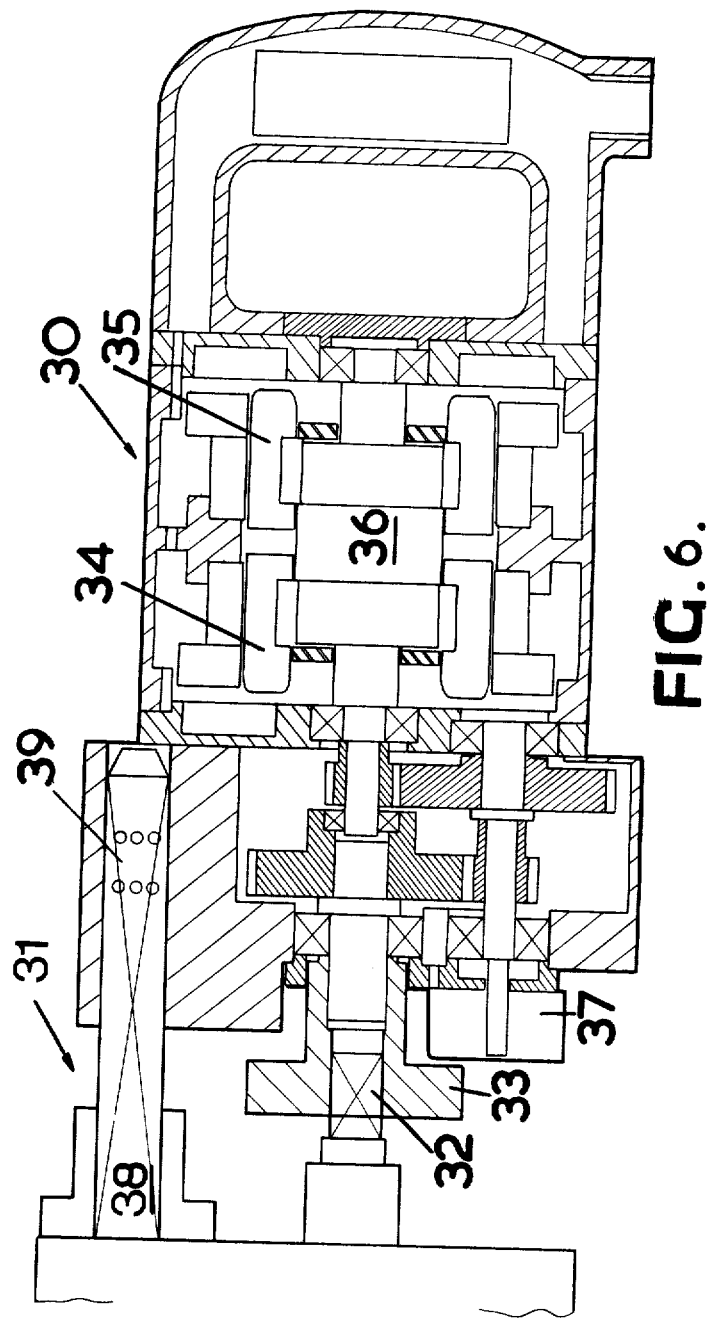

SETTING UP MACHINE INCLUDING COMPUTER-CONTROLLED POSITIONER FOR MACHINE PART ADJUSTING ELEMENT

This invention relates to the setting up of machines, especially but not exclusively machine tools, by means of numerically controlled positioners or axis drive units.

Many machine tools, and in particular woodworking machines such as double end profilers, have cutting heads that can be adjusted in two or three mutually perpendicular directions. To change from one work programme to another each cutter must be reset along each axis of movement, and for a double end profiler with a large number of cutters this can mean that the machine is idle for considerable periods. On occasion the idle time can be more than the actual working time.

The invention provides a setting up unit for machinery comprising a transportable positioner for machine axes, means for connecting the positioner to individual axes in turn, a computer for controlling the operation of the positioner to shift a machine element on a machine axis from one predetermined setting to another and means for identifying the machine axis to which the positioner at any time is connected and conveying that information to the computer. Depending on the size of the computer, such a unit can be used for setting up any number of machine axes for any number of machine operations. Thus a single unit could be used to service a whole factory of machines. The unit is particularly suitable for woodworking machinery which requires periodic alteration of the setting of cutter heads for different operations.

In use, the positioner is connected in any order to each of the machine part adjusting elements, information is fed to the computer to identify each particular element, and the computer obtains, from its memory banks and/or programme tapes, information regarding the last position of a machine part adjusting and, from its programmed information, the desired new set up of the machine part. The computer then makes the necessary calculation and causes the positioner to move the machine element to the new set up position. The new position of the machine element is then recorded in the memory banks of the computer.

The computer must be capable of comparing input information with a stored memory and controlling the positioner by a system of logic. The computer is preferably a transportable miniaturized computer, known as a mini-computer. Such mini-computers are capable of controlling a number of machine axes, and by interchanging memory and/or programme tapes of a computer the number of axes it can control can be extended.

The transportable positioner is preferably portable, and may be connected to the computer for example by a flexible cable. The positioner may be adapted to move the machine elements along or about their appropriate axes by means of a lead screw, a rack and pinion or a hydraulic jack. Alternatively the machine elements may be moved pneumatically against a stop that is positioned by the positioner, for example one of several stops on a turret that is rotatable by the positioner to bring the appropriate stop into an operative condition. Each machine element of a machine tool conventionally is movable by means of its own lead scew or screws and for such an application the positioner would comprise an electric motor for driving the lead screw of each axis of the machine tool. The electric motor must be adapted to be accurately controlled by the computer, and may be, for example, a step motor or a continuous running motor with a resolver or encoder. If desired inaccessible machine parts can be provided with their own individual positioners for connection to the computer.

Information must be supplied to the computer regarding the particular axis which is being controlled by the positioner at any time. This information may be supplied by manual input, a code number for the particular axis being supplied to the computer through a keyboard for example, or may be supplied by the automatic registering of machine parts. For example, studs on the machine may register with apertures in the positioner or vice versa, so that microswitches associated with the studs or apertures enable the computer to recognize the axis and the machine to which the positioner has been connected. To avoid malfunction in such an arrangement if one or more of the apertures becomes clogged with dirt or grease, the microswitches may be replaced by transducers on the positioner for identifying the presence and position of non-ferromagnetic parts of an otherwise ferromagnetic part of the machine. The non-ferromagnetic parts may still be apertures, but even if clogged will still maintain their non-ferromagnetic character.

When the machine elements are to be driven by lead screws, it is necessary to provide for positive location of the positioner on the machine so that the lead screws are not turned by rotation of the positioner as a unit. This positive location may be in the form of a stud on the machine or on the positioner which locates in a co-operating recess when the positioner is connected to the machine, or a locating column on the machine on which the positioner is located prior to engagement with the end of the lead screw. The lead screw ends are preferably standardized to permit the same positioners to be applied to any axis.

For some applications it may be desired to use the positioner as non-numerically controlled power source when connected to certain axes. If this facility is required, the locating stud or column is preferably provided on the machine, with a co-operating recess in the positioner. Electrical contacts in the positioner can be arranged so that numerical control from the computer is provided only when a stud or column is in the recess. Thus the positioner can be used as a transportable power source independently of the computer for axes not provided with such studs.

The information stored in the computer memory in relation to each machine axis preferably includes the present position of a machine element along that axis, the desired new position, the desired move direction, the pitch of the lead screw, the optimum speed of travel and the allowable torque. The desired move direction enables the new machine setting to be approached always from the same direction, which removes the effect of possible backlash and avoids the necessity to use precision made lead screws. The information regarding allowable torque enables the motor of the positioner to cut out if for example an adjusting screw is forced against its lock or against a dead stop.

The machine axes may be protected from manual adjustment if desired, but a possible advantage of having no such protection is that wear of a machine element, for example a cutter blade, can be compensated by manual adjustment. The computer is given no information regarding this adjustment and accordingly makes no erroneous compensation when moving the machine element to a subsequent set up position. A facility for re-zeroing the machine elements is preferably provided, for example a dead-stop on the machine and means for conveying information to the computer that the machine element is in contact with the dead-stop.

The invention is hereinafter particularly described by way of example only with reference to the drawings, of which:

FIG. 6 is an axial section through an alternative positioner mounted on a machine tool;

Figure 3:
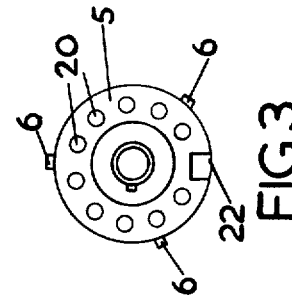
FIG. 3 is an end view of a connection plate mounted on the machine tool of FIG. 2.
Figure 1:
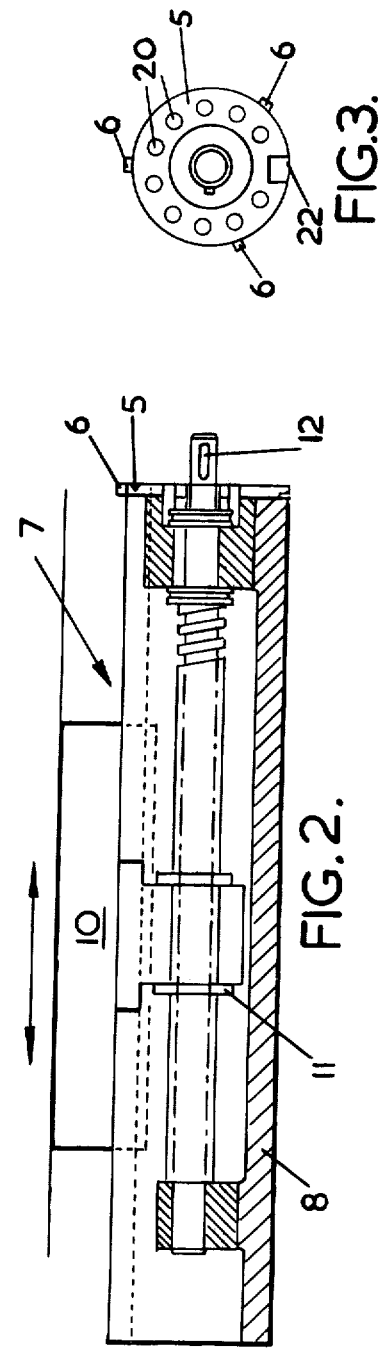
FIG. 1 is a side elevation of a setting up unit according to this invention.

The unit of FIG. 1 comprises a positioner 1 controlled by a mini-computer 2 through a flexible cable 3. The positioner 1 is portable, and is provided with a freely rotatable collar 4 for securing the positioner to a connection plate on a machine tool by a bayonet fastening action. A typical connection plate 5 is shown in FIGS. 2 and 3, and has lugs 6 for co-operation with the collar to effect the fastening.

Figure 2:
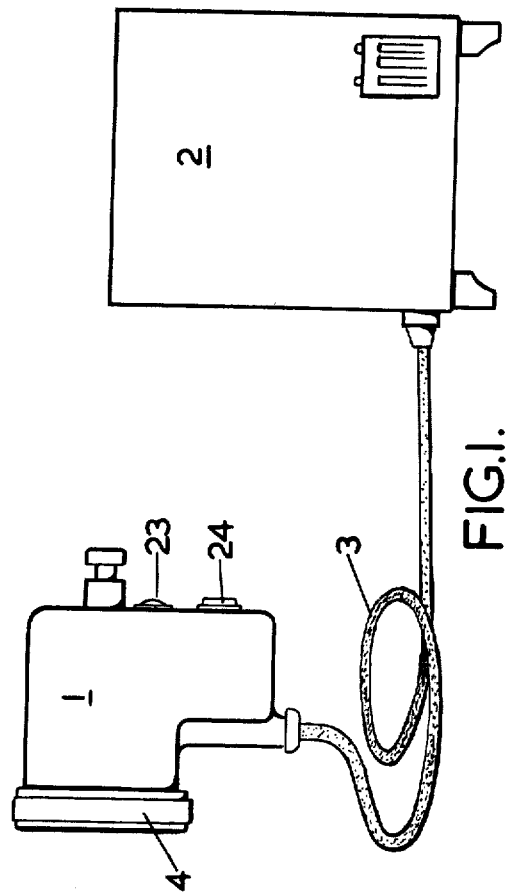
FIG. 2 is an axial section through a simple machine tool with a laterally movable machine element.
Figure 5:
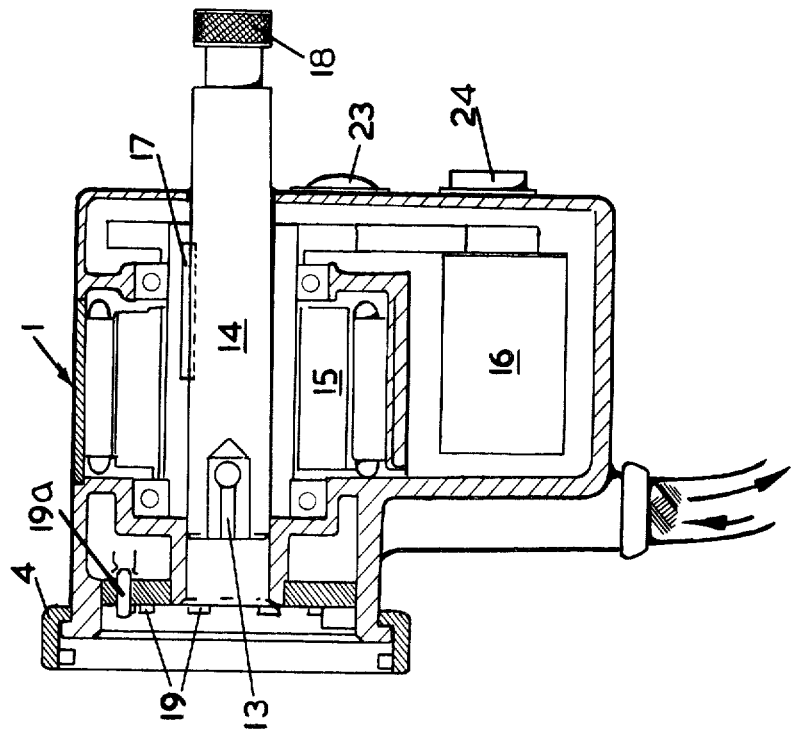
FIG. 5 is an axial section through the positioner of FIG. 1.
Figure 4:
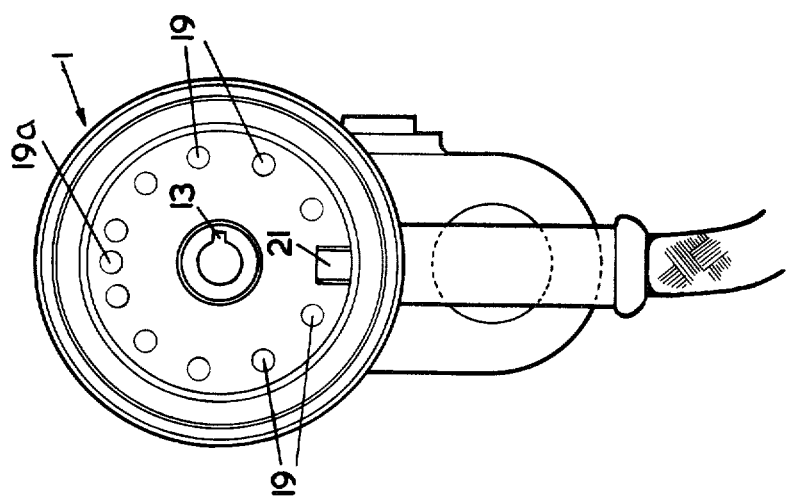
FIG. 4 is an end view of the positioner of FIG. 1.

The machine tool 7 of FIG. 2 comprises a machine bed 8 mounting a lead screw 9 along the axis of which a machine element 10 is reciprocally movable. A nut 11 of the machine element 10 is threaded on the lead screw 9. A key 12 on one end portion of the lead screw shaft is adapted to co-operate with a keyway 13 (FIGS. 4 and 5) of the positioner drive shaft 14. The positioner comprises an electric motor 15 and resolver 16, and the drive shaft 14 is axially movable in a keyway 17. When the positioner 1 is fitted onto a connection plate 5 of a machine tool, the key 12 and keyway 13 will initially not be in alignment, and the drive shaft 14 will be in its right hand non-engaging position as shown in FIG. 5. The drive shaft 14 may be turned manually by means of a knurled knob 18 until the keyway 13 is in alignment with the key 12, and is then moved towards the machine tool to bring it into its engaging position (not shown). A light spring may bias the drive shaft 14 into its engaging position or a ball detent (not shown) may be provided to retain it in its engaging position after it has been moved manually. Electric switch means (not shown) are operative when the drive shaft 14 is in its engaging position so that until this position is reached the positioner 1 cannot be controlled by the computer 2.

Ten studs 19 are provided around the drive shaft 14 of the positioner for location in recesses 20 in the connection plate 5. From one to 10 recesses 20 may be formed in the positions indicated in FIG. 3, and the positions of the recesses identify the particular axis around which the plate 5 is mounted. Each stud 19 is axially movable and is spring-biased outwardly so that when the positioner 1 is connected to the machine tool some studs extend into recesses 20 and some contact the plate 5. The positions of the studs 19 produce an electrical signal to the computer which identifies the axis to which the positioner is connected.

An eleventh stud 19a is provided at a position which never corresponds to a recess in the plate 5. Depression of this stud 19a indicates to the computer 2 that the positioner is connected to the machine.

A tapered key 21 on the positioner 1 co-operates with a slot 22 in the connection plate 5 for accurate angular location of the positioner.

A light 23 on the positioner 1 becomes illuminated only when the stud 19a is depressed indicating proper connection of the positioner to the machine tool, and the drive shaft 14 is in its left hand operative position. When the light 23 is illuminated, an operator can press a pushbutton 24 to start the motor 15, which is thereafter operated by the computer 2 until the new set up position of the machine element 10 has been attained. The attainment of this new set up condition is indicated by the light 23 becoming extinguished.

The mini-computer 2 may be programmed with information regarding the optimum or the maximum desired speed of movement of each machine element, so that damage to the machine parts through the generation of excessive torque can be avoided. If desired, a display panel on the computer can indicate when all the relevant axes of a particular machine have been altered to a new set up position.

Figure 7:
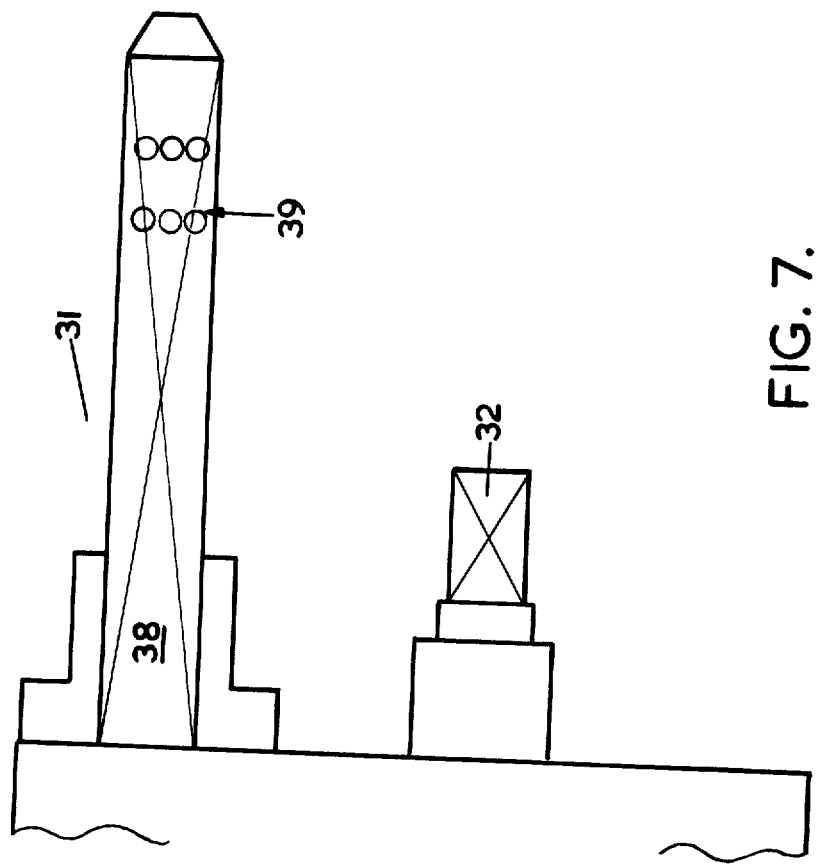
FIG. 7 is a side view of a mounting for the positioner of FIG. 6.

FIGS. 6 and 7 illustrate a modified positioner 30 and mounting 31. This positioner 30 is in use connected to the mini-computer 2 exactly as in FIG. 1. The lead screw of the machine axis in this embodiment is shown as having a square end 32 engageable in a chuck 33 of the positioner 30. The chuck 33 is rotatable by means of a pair of electric motor windings 34 and 35 acting on an armature shaft 36 of the positioner. An encoder 37 records how many revolutions or part revolutions the shaft 36 makes and conveys this information to a memory counter in the computer, which controls the current to the motor windings.

The mounting 31 for the positioner 32 comprises a square section metal shaft 38 extending from the machine tool adjacent an axis of movement of a machine element and in a direction parallel to that axis. A pattern of blind bores 39 drilled in the side of the shaft 38 serves to identify the machine axis to the computer when the positioner 30 is located on the shaft 38. Limit switches or transducers (not shown) in the positioner 30 transmit the necessary information to the computer through a flexible cable (not shown).

The computer 2 is preferably trolley-mounted and controlled from a control panel on the trolley and from a pocket-sized pendant which, like the positioner, is linked to the trolley by means of a flexible electrical lead. A typical sequence of operator actions using a positioner according to FIG. 6 would be as follows:

a. The trolley is wheeled to the machine to which it is to be applied, plugged in and switched on.

b. For initial setting-up of a machine, each adjustable setting screw is datumed. Normally this would not be necessary as the computer would have stored in memory the position of each axis as it was left after the previous set-up.

c. Information concerning the head positions for the job to be run is loaded into the computer by means of a paper tape.

d. The portable positioner 30 is engaged with an adjusting screw end 32, in the same manner as a nut runner, and with the associated mounting pillar 31.

e. When positive location has been made, the screw axis is identified by means of the pattern of drilled holes 39 on the pillar 31 and a sensing device in the positioner. The computer then scans its memory banks for data relevant to that screw, including present position, move direction, pitch of screw and allowable torque.

f. The present position is then compared with the new required position, and on the depression of a button, the computer causes the servo motor in the positioner to position the axis, its movement being constantly monitored by means of the encoder 37 and computer.

g. On arrival at the new position, the memory of the computer is automatically updated, such that when it is required to re-position the screw for subsequent jobs, it is not necessary to re-datum the screw every time.

h. To complete the setting-up of the machine, this procedure is repeated for each screw adjustment.

What we claim is:

1. A setting up unit for machinery comprising a transportable positioner for machine part adjusting elements, means for connecting the positioner to individual adjusting elements in turn, a computer for controlling the operation of the positioner to shift a machine part adjusting element connected to the positioner from one predetermined setting to another and means for identifying the machine part adjusting element to which the positioner at any time is connected and conveying that information to the computer.

2. A setting-up unit according to claim 1, wherein the computer is a transportable miniaturized computer.

3. A setting-up unit according to claim 1, wherein the positioner is portable and is connected to the computer by means of a flexible cable.

4. A setting-up unit according to claim 1, wherein the positioner contains a motor for shifting an adjusting element to which the positioner is connected, and a sensor responsive to the operation of the motor.

5. A setting-up unit according to claim 1 wherein the positioner is provided with sensing means for identifying the adjusting element to which it is connected, and means for conveying that information automatically to the computer.

6. A setting-up unit according to claim 5, wherein the sensing means comprises a group of limit switches engageable in a pattern of holes in locating means on the machine.

7. A setting-up unit according to claim 5, wherein the sensing means comprises a group of transducers for sensing the pattern of a group of holes in locating means on the machine.

* * * * *